United States Patent
Sfar

(10) Patent No.: US 9,756,558 B2
(45) Date of Patent: Sep. 5, 2017

(54) PERFORMING A RADIO RESOURCE CONTROL CONNECTION ESTABLISHMENT IN ACCORDANCE WITH A CELL SELECTION PROCESS

(71) Applicant: Telefonaktiebolaget L M Ericsson (publ), Stockholm (SE)

(72) Inventor: Safouane Sfar, Nürnberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 182 days.

(21) Appl. No.: 14/427,409

(22) PCT Filed: Aug. 13, 2013

(86) PCT No.: PCT/EP2013/066921
§ 371 (c)(1),
(2) Date: Mar. 11, 2015

(87) PCT Pub. No.: WO2014/029668
PCT Pub. Date: Feb. 27, 2014

(65) Prior Publication Data
US 2015/0296444 A1    Oct. 15, 2015

Related U.S. Application Data

(60) Provisional application No. 61/692,266, filed on Aug. 23, 2012.

(51) Int. Cl.
*H04W 4/00* (2009.01)
*H04W 48/16* (2009.01)
(Continued)

(52) U.S. Cl.
CPC ......... *H04W 48/16* (2013.01); *H04W 76/028* (2013.01); *H04W 48/20* (2013.01); *H04W 76/02* (2013.01)

(58) Field of Classification Search
CPC ............................ H04W 48/16; H04W 76/028
See application file for complete search history.

(56) References Cited

U.S. PATENT DOCUMENTS

| 2006/0258386 A1* | 11/2006 | Jeong | H04W 36/24 455/525 |
| 2010/0029274 A1* | 2/2010 | Deshpande | H04J 11/0093 455/435.3 |
| 2011/0065433 A1* | 3/2011 | Iwamura | H04W 36/0088 455/434 |

FOREIGN PATENT DOCUMENTS

SE    WO 2014029668 A1 *  2/2014  .......... H04W 76/028

OTHER PUBLICATIONS

ITRI, "Clarification for essential system information missing", 3GPP TSG RAN WG2#65, Feb. 9, 2009, pp. 1-2, R2-091164, 3GPP, Athens, Greece.
(Continued)

*Primary Examiner* — Keith Fang
(74) *Attorney, Agent, or Firm* — Patent Portfolio Builders, PLLC

(57) ABSTRACT

A method of performing a Radio Resource Control, RRC, connection establishment in accordance with a cell selection process, wherein a first timer is used to controlling that the cell selection process is performed within a first time, and a second timer is used to controlling that a cell is treated as barred for a second time if certain system information associated to that cell is missing or cannot be acquired, and controlling the first timer and the second timer such that the second timer expires in a time period after the first timer has been started and before the first timer has expired. The invention further refers to a User Equipment (UE) that performs the method and a computer program loadable into the UE.

14 Claims, 4 Drawing Sheets

(51) Int. Cl.
    *H04W 48/20* (2009.01)
    *H04W 76/02* (2009.01)

(56) References Cited

OTHER PUBLICATIONS

LG Electronics Inc., "Considerations on system information reading and re-establishment procedure", 3GPP TSG-RAN2 Meeting #64, Nov. 10, 2008, pp. 1-6, R2-086718, 3GPP, Prague, Czech Republic.
Qualcomm Europe, "Error handling on common channels, redux", 3GPP TSG-RAN WG2 #64bis, Jan. 12, 2009, pp. 1-4, R2-090114, 3GPP, Ljubljana, Slovenia.
Huawei, "Acquire system information upon RRC connection re-establishment", 3GPP TSG RAN WG2 #65bis, Change Request, Mar. 25, 2009, pp. 1-4, R2-092655, 3GPP, Seoul, South Korea.
Panasonic, "UE behavior in the case of essential SIB missing", 3GPP TSG RAN WG2#64, Nov. 10, 2008, pp. 1-2, R2-086333, 3GPP, Prague, Czech Republic.
3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 11)", Technical Specification, 3GPP TS 36.304 V. 11.0.0, Jun. 1, 2012, pp. 1-33, 3GPP, France.

\* cited by examiner

PERFORMING A RADIO RESOURCE CONTROL CONNECTION ESTABLISHMENT IN ACCORDANCE WITH A CELL SELECTION PROCESS

TECHNICAL FIELD

The present invention relates to Radio Resource Control—RRC—Connection Establishment, and specifically to a handling of User Equipment (UE) timers associated to such processing.

BACKGROUND

3GPP introduced the LTE (Long Term Evolution) that provides core network entities for supporting real-time voice and multimedia IP services.

Currently, RRC connection re-establishment procedure as described by 3GPP TS 36.331; in the following reference is made to TS 36.331 release 10. Aforementioned reference shows some bottlenecks being implemented, because it might bring some conflicts with respect to management of UE timers (specifically the so-called T311 timer for supervising a RRC connection re-establishment as specified in TS 36.331, and a barred timer supervising that a barred cell is not selected within a certain time) used to handling a barring of a cell when essential system information are missing.

On the other hand, this procedure takes some time due to cell selection process, which needs system information (comprising a so-called Master Information Block—MIB—and a number of System Information Blocks—SIB—). The UE needs to locate and read relevant system information before re-establishing any connection to the access network (E-UTRA).

The purpose of RRC connection re-establishment procedure is to re-establish the RRC connection, which involves e.g. a resumption of SRB1 operation, a re-activation of security and a configuration already given by network.

It is desired to reduce the duration of this process in order to improve overall quality of service offered to the end user.

Specifically, according to above-cited TS 36.331, the UE shall only initiate the procedure when AS security has been activated. The UE initiates the procedure when one of the following conditions is met:
  upon detecting radio link failure, in accordance with section 5.3.11; or
  upon handover failure, in accordance with section 5.3.5.6; or
  upon mobility from E-UTRA failure, in accordance with section 5.4.3.5; or
  upon integrity check failure indication from lower layers; or
  upon an RRC connection reconfiguration failure, in accordance with section 5.3.5.5.

TS 36.331 specifies a timer referred to as T310 and further specifies above mentioned timer T311. The timer 310 is started if physical layer problems occur (receiving consecutive out-of-synch-indications); the UE will go to RRC idle mode after expiration of this timer if access stratum (AS) security has not been activated, otherwise start T311 if AS security has been activated. AS security may comprise the establishment of an integrity protection of RRC signaling (messages) and ciphering of a RRC signaling and user data, so that the UE and the network may exchange data.

T310 values are selected by the network and may be chosen as one of 0 ms (milliseconds), 50 ms, 100 ms, 200 ms, 500 ms, 1000 ms, 2000 ms according to TS 36.331.

Upon expiration of T310, T311 is started to supervise that RRC re-establishment procedures are performed in time. According to TS 36.331 the network may choose T311 value as one of: 1000 ms, 3000 ms, 5000 ms, 10000 ms, 15000 ms, 20000 ms, 30000 ms Both T310 and T311 values may be provided for the network to the UE.

Specifically, upon initiation of the procedure, the UE mainly shall:
  stop timer T310, if running;
  start timer T311;
  further:
  suspend all RBs except SRB0;
  reset MAC;
  apply the default physical channel configuration as specified in section 9.2.4;
  apply the default semi-persistent scheduling configuration as specified in section 9.2.3;
  apply the default MAC main configuration as specified in section 9.2.2;
  release reportProximityConfig and clear any associated proximity status reporting timer;
  In addition, the UE shall:
  perform cell selection in accordance with the cell selection process as specified in TS 36.304, current version 11.

Starting timers in the UE might be regarded as to count down from predefined values and either to supervise that certain actions are performed before expiration of a timer (reaching "0" value) and/or performing certain actions after expiration. Starting T311 might mean to count down from a predefined T311 value and to supervise that a selection of a suitable cell or a cell using another RAT is performed before expiration. Timer T311 might be stopped e.g. after such suitable selection. If the selection cannot be performed before the expiration of the timer, the UE shall enter the RRC idle state (RRC_IDLE).

The cell selection process as specified in TS 36.304 includes fresh system information (MIB/SIB) reading. In section 5.2.2.2 of TS 36.331, it is stated that the UE shall apply the system information acquisition procedure upon selecting and upon re-selecting a cell, after handover completion, after entering E-UTRA from another RAT, and upon return from out of coverage.

Hence, when the timer T311 is running, the UE shall re-read system information.

In section 5.2.2.2 of TS 36.331 it is further specified that a cell shall be barred, if essential system information is missing (as indicated in TS 25.331 current version 11, this may similarly apply to 3G systems). Such barring might be controlled by a so-called barred timer in the UE that may be started upon a detection of problems to get the essential system information. The value of this barred timer is not specified in the standard and may be UE implementation specific.

A problem is that the UE cannot select the previous serving cell in case of barred timer value being greater than the T311 timer value given by network; in such case the UE goes to IDLE state (after T311 expiration) and looses the RRC connection, despite of a relation to the previous serving cell (this cell may be a good cell to be selected to resume the RRC connection).

SUMMARY

It is an object of the present invention to improve existing procedures.

This object is achieved by the independent claims. Advantageous embodiments are described in the dependent claims and by the following description.

In an embodiment, a new manner for a management of handling a cell barring within the UE e.g. a barred timer started to consider previous serving cell as barred for some time due to missing essential system information (cell barred due to essential system information missing described in section 5.2.2.5 of TS 36.331).

In an embodiment, a User Equipment (UE) performs a Radio Resource Control, RRC, connection establishment, performing a cell selection in accordance with a cell selection process, wherein a first timer is used to controlling that a selection of a cell is performed within a first time, and a second timer is used to controlling that a cell is treated as barred for a second time if certain system information associated to that cell is missing, and wherein the first timer and the second timer a controlled such that the second timer expires after the first timer has been started and before the first timer has expired.

In an embodiment thereto, (after an unsuccessful acquiring of system information of a previous serving cell), the UE changes the value of the first timer or (timer) T311 such that the second timer or barred timer expires later than the T311. Thereto, an actual value of T311 may be modified such that it expires not earlier (or later) than the barred timer (in other words, the time to be measured by T311 is made longer than commanded by the network). As an exemplary modification of T311, the new T311 timer value is set to a sum of the old T311 timer value and the value of barred timer.

A further solution is proposed in that the value of the barred timer is modified such that is expires later (or at least not earlier) than the T311. In an embodiment thereto, the barred timer value used for the connected mode is set equal to the minimum specified value of T311, divided by a value x, wherein the value x is a pre-defined value greater than 1 (e.g. stored in the UE). Within this solution, the UE may have two values for the barred timer: one for connected mode which is set equal to the minimum value of T311 divided by x and one for the idle mode which may be kept independent from the T311.

A further solution is proposed in that the UE considers the previous serving cell as barred without starting the barred timer when T311 is running. The UE may try to connect to another cell different to the previous serving cell, but only tries to re-connects to that previous serving cell, if no other cell is available.

Above-proposed solution may mitigate the problem that the UE may not be able to select the previous serving cell in case that the barring time (supervised by means of the barred timer) expires before the cell re-selection process controlled by T311. Thus it may be avoided that the UE goes to IDLE state and loses the RRC connection, if the previous serving cell is a good cell to be selected to resume the RRC connection.

The present invention also concerns computer programs comprising portions of software codes in order to implement the method as described above when operated by a respective processing unit of a UE. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
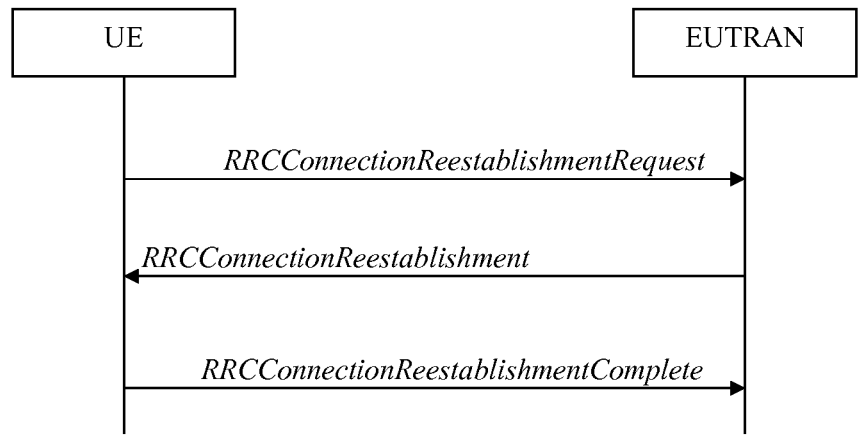
FIG. 1 shows a sequence diagram of sequences exchanged between a UE and the radio access network according to a successful RRC connection re-establishment.
Figure 2:
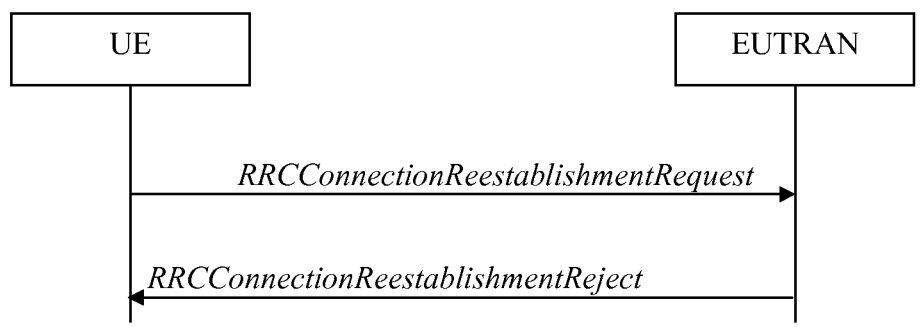
FIG. 2 shows a sequence diagram of sequences exchanged between a UE and the radio access network according to an unsuccessful RRC connection re-establishment.

FIG. 1 and FIG. 2 show sequence diagrams of sequences exchanged between a UE and the radio access network each for a successful (FIG. 1) and an unsuccessful RRC connection re-establishment (FIG. 2) according to 3GPP specifications.

Figure 3:
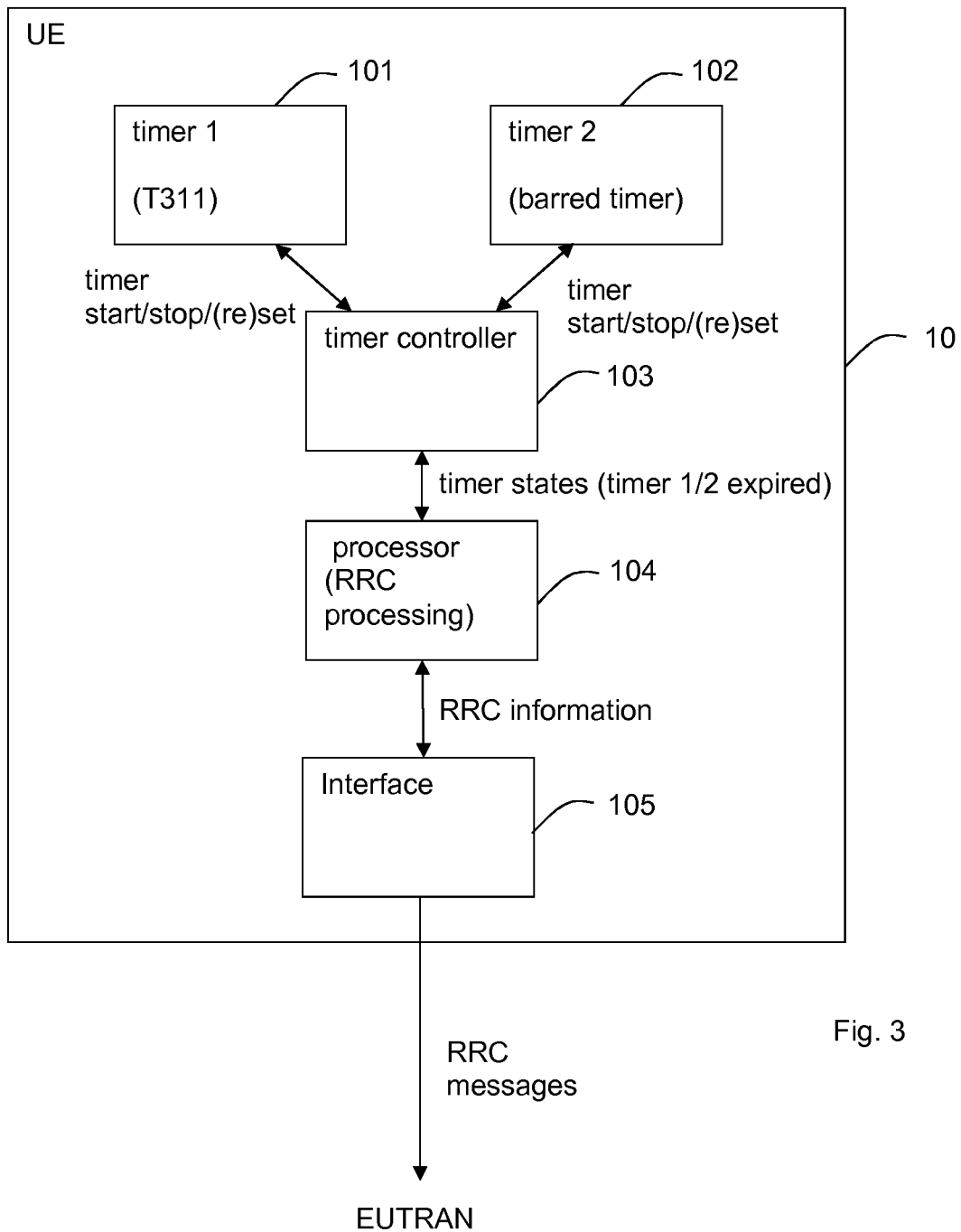
FIG. 3 shows a block diagram of a UE comprising exemplary functional blocks for performing the invention.

FIG. 3 shows a block diagram with exemplary blocks or functions of a UE 10 comprising a first timer 101, a second timer 102, a timer controller 103, a processor 104 and an interface 105.

The first timer 101 may be the timer 311 as discussed above, i.e. a timer that controls that the RRC connection re-establishment procedure is performed in a certain time.

This timer is started upon initiating the RRC connection re-establishment procedure and it is stopped when a suitable cell is selected. At expiry of said timer, the UE enters an idle mode, i.e. RRC idle mode (RRC_IDLE) is entered.

The second timer 102 that may be the so-called barred timer as discussed above that supervises that before expiration of this time, a barred cell is not selected.

The interface 105 is adapted to communicate with the EUTRAN (network radio access side). Specifically, it exchanges RRC message as shown in FIG. 1 and FIG. 2 and communicates this information to the processor 104, Received RRC messages e.g. comprise system information, e.g. aforementioned MasterInformationBlock (MIB), SysteminformationBlock Type 1 (SIB1), and/or Systeminformation Block Type 2 (SIB2).

The timer controller 103 is adapted to control the timers, e.g. to start, stop, set and reset the first timer 101 and the second timer 102 based on commands received from the processor. It further may report the actual timer values or timer states (e.g. timer expired) to the processor 104.

The processor performs an RRC connection re-establishment as discussed above in dependency of the actual timer values or states.

During cell (re-)selection process, the UE will try to acquire system information. According to TS 36.331, section 5.2.2.5 (Essential system information missing), the UE shall:
  if in RRC_IDLE or in RRC_CONNECTED while the first timer 101 (T311) supervising the RRC re-establishment procedure is running:
    if the UE is unable to acquire the MasterInformationBlock or the SystemInformationBlockType1:

consider the cell as barred in accordance with TS 36.304 and;

else if the UE is unable to acquire the SystemInformationBlockType2:

treat the cell as barred in accordance with TS 36.304.

Thereto, the second timer 102 is started to supervise that the cell considered (treated) as barred is not selected for a certain time, i.e. before an expiry of the second timer 102.

Embodiments of the invention take care that the previous serving cell is considered as barred cell by the UE only up to a time point before the first timer 101 expires.

Thereto, the timer controller 103 may coordinate both timers 101 and 102 such that the first timer 101 does not expire before expiry of the second timer 102. Thereto, the (start-) value of the first timer 101 may be set in dependency of a value of the second timer 102 before starting the first timer 101. Specifically, the value of the first timer 101 may be modified that (after an unsuccessful acquiring of system information of the previous serving cell) the start value (new timer value) of the first timer 101 value equals to a sum of the old timer value (the actual timer value of the running timer) and the value of the second timer 102.

Alternatively, the timer controller 103 may be adapted to set the value of the second timer 102 such that this timer expires before an expiry of the first timer 101. In order to ensure an earlier expiry of the second timer under all conditions, the second timer may be set to a value smaller that a minimum specified value of the first timer 101. According to TS 36.331 version 10, the minimum value of T311 is specified as 1 second. Thus, the UE may take the minimum specified value for T311, i.e. the first timer 101 and divide this time by a constant x that is greater than 1. The constant x may be kept stored in the UE.

Further alternatively, the second timer 102 is not started, but the UE tries to select a suitable cell differently from the previous serving cell. Only of the UE cannot find a different serving cell, the UE re-connects to the previous serving cell.

Figure 4:
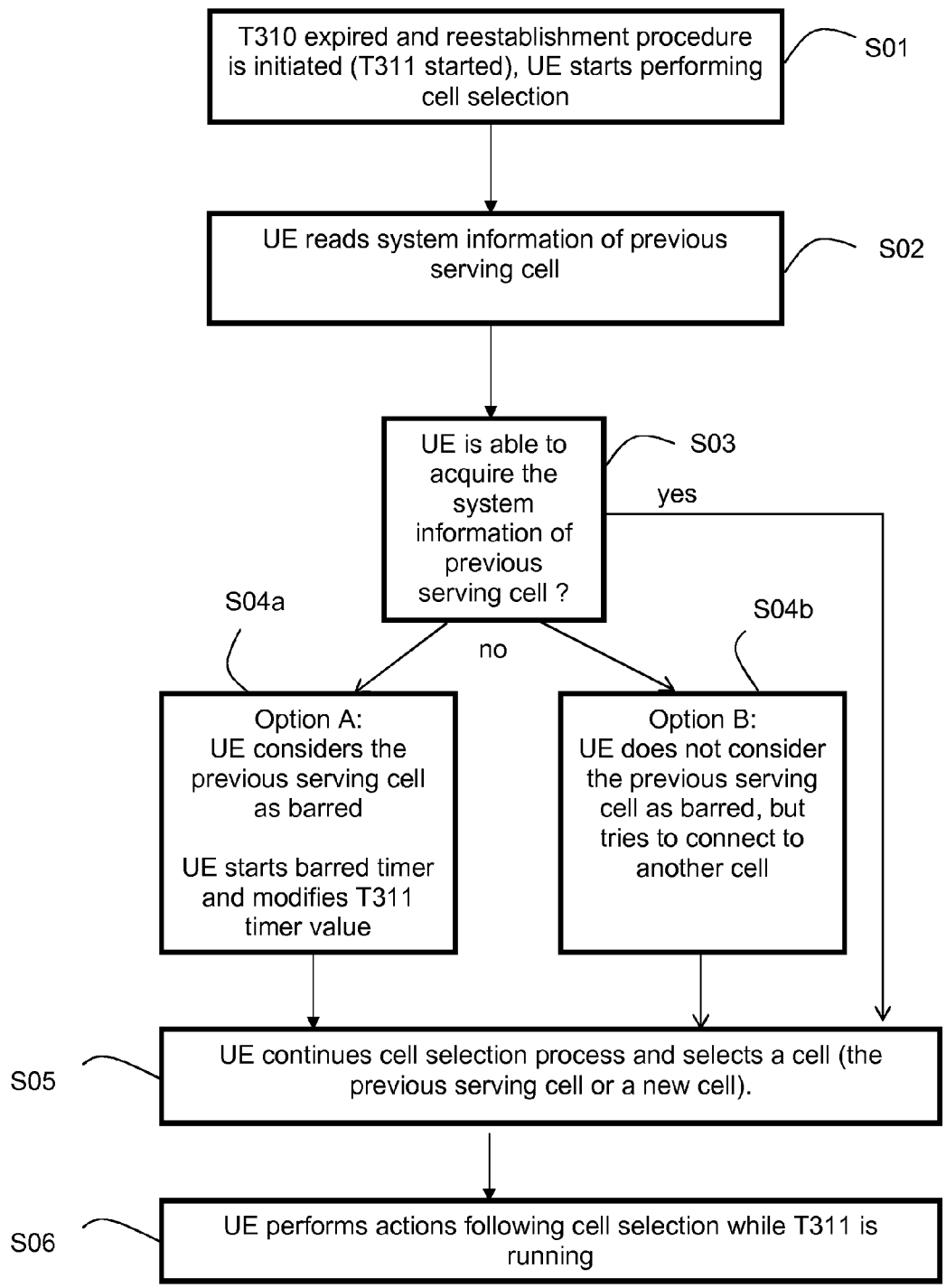
FIG. 4 shows a first exemplary RRC connection re-establishment procedure focusing on a situation wherein the UE tries to read essential system information.

FIG. 4 shows a first exemplary RRC connection re-establishment procedure.

In a first step S01, it is assumed that T310 expired and reestablishment procedure is initiated (T311 started), The UE 10 starts performing cell selection in accordance with the cell selection process as specified in TS 36.304

In a second step S02, the UE reads 10 system information of the previous serving cell as specified in TS 36.304.

In a third step S03, depending on whether the UE 10 is able to acquire the system information of the previous cell or not, the UE performs one of the following two options (forth step first option S04a or second option S04b) (if not), or directly jumps to a fifth step S05 described later (if yes).

In the fourth step first option S04a, the UE 10 considers the previous serving cell as barred in accordance with TS 36.304. The UE starts the second timer 102 (barred timer) and modifies the value of the first timer 101 (T311 timer). The modified value may equal a sum of the old value of the first timer 101 (the actual value of the running timer before modification) and the value of the second timer 102. Alternatively, the value of the second timer 102 may be modified (before starting) such that it does not expire later (or not earlier) than the first timer. Thereto, the second timer may be modified, e.g. set equal to the minimum specified value of T311, divided by a value x, wherein the value x is a pre-defined value greater than 1 (e.g. stored in the UE). As discussed above, the UE may keep different values for the barred timer: one value that is set in dependency of the first timer 101 upon starting the second timer in connected mode and another one for the idle mode which may be kept independent from the T311.

In the fourth step second option S04b, the UE 10 considers does not consider the previous serving cell as barred (and hence does not start the second timer). However, the UE 10 tries to select another cell if another cell is available.

In the fifth step S05, the UE 10 continues cell selection process as specified in TS 36.304 and selects a new cell or the previous serving cell.

In a sixth step S06 UE may perform actions following cell selection while the second timer (T311) is running e.g. as specified in TS 36.331 section 5.3.7.3

Figure 5:
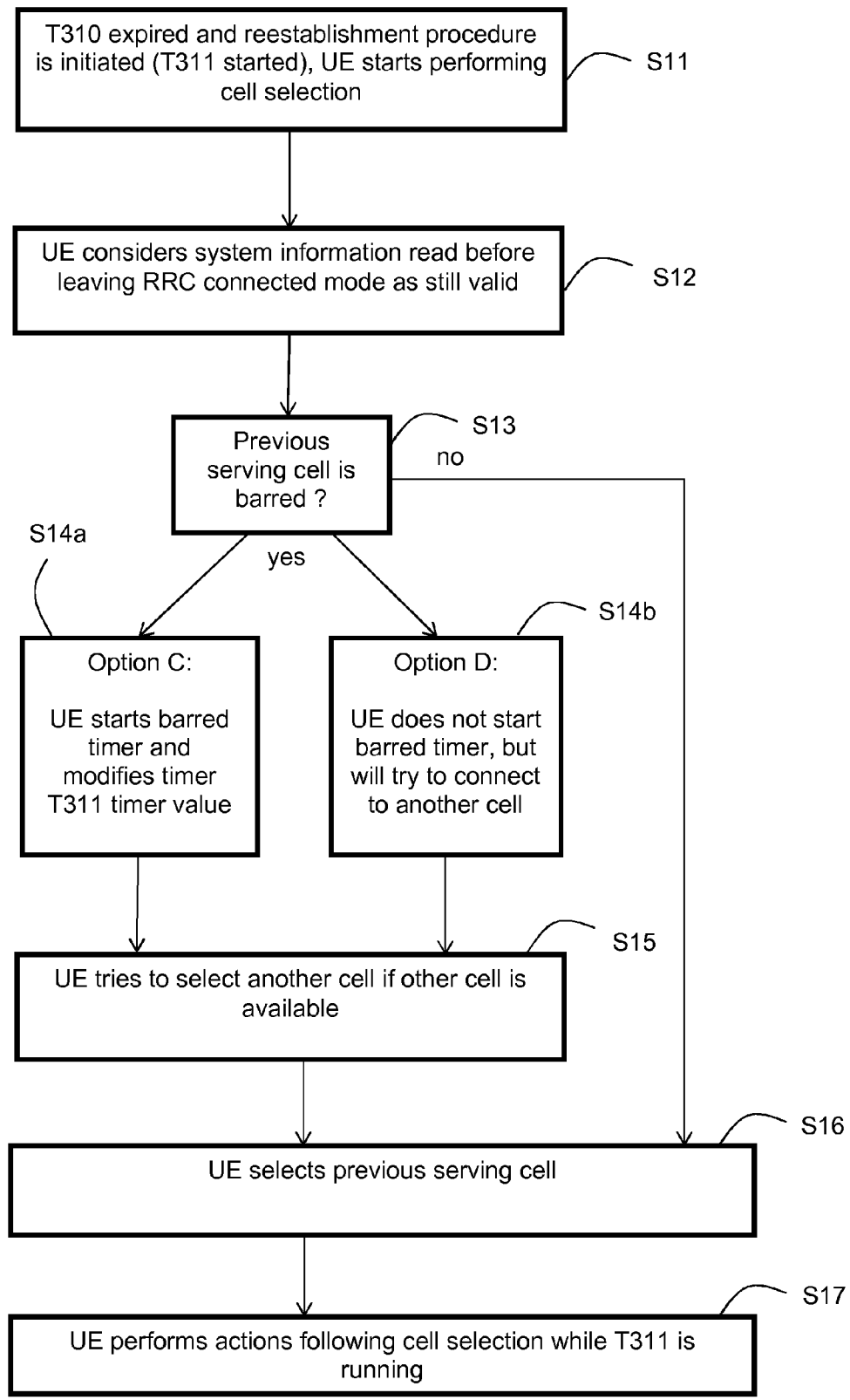
FIG. 5 shows a second exemplary RRC connection re-establishment procedure focusing on the option that the UE considers the system information read before as valid.

FIG. 5 shows a second exemplary RRC connection re-establishment procedure.

In a first step S11 (of the second procedure), it is assumed that T310 expired and reestablishment procedure is initiated (T311 started), The UE 10 starts performing cell selection in accordance with the cell selection process as specified in TS 36.304

In a second step S12 (of the second procedure), the UE doesn't read system information of previous serving cell and considers that system information read during RRC connected mode as still valid.

In a third step S13 (of the second procedure), depending on whether the previous serving cell is barred due to missing essential system information in the connected mode (e.g. the UE being. unable to acquire the MasterInformationBlockorthe SystemInformationBlockType1) either one of the following options (forth step first option S14a or second option S14b) (if not being able), or directly jumps to a sixth step S16 (of the second procedure) (if being able):

In the fourth step first option S14a (of the second procedure), the UE 10 considers the previous serving cell as barred in accordance with TS 36.304. The UE starts the second timer 102 (barred timer) and modifies the value of the first timer 101 (T311 timer). The modified value may equal a sum of the old value of the first timer 101 (the actual value of the running timer before modification) and the value of the second timer 102. Alternatively, the value of the second timer 102 may be modified (before starting) such that it does not expire later (or not earlier) than the first timer. Thereto, the second timer may be modified, e.g. set equal to the minimum specified value of T311, divided by a value x, wherein the value x is a pre-defined value greater than 1 (e.g. stored in the UE). As discussed above, the UE may keep different values for the barred timer: one value that is set in dependency of the first timer 101 upon starting the second timer in connected mode and another one for the idle mode which may be kept independent from the T311.

In the fourth step second option S14b (of the second procedure), the UE 10 considers the previous serving cell as barred without starting the second timer.

In a fifth step S15 (of the second procedure), the UE 10 tries to select another cell if another cell is available because the previous serving cell is considered as barred.

In a sixth step S16 (of the second procedure), the UE 10 continues cell selection process as specified in TS 36.304 and selects the previous serving cell.

If no other cell is available and no issues related to Essential system information missing in the previous serving cell occurred, the previous serving cell can be selected now as the second timer has not been started and the first timer is still not expired.

In a seventh step S17 (of the second procedure), the UE 10 may perform actions following cell selection while the second timer (T311) is running e.g. as specified in TS 36.331 section 5.3.7.3

The invention claimed is:

1. A method, in a user equipment (UE), for performing Radio Resource Control (RRC) connection establishment, the method comprising:
performing cell selection in accordance with a cell selection process, wherein a first timer is used to control that the cell selection process is performed within a first time, and a second timer is used to control that a cell is treated as barred for a second time if certain system information associated to that cell is missing or cannot be acquired; and
controlling the first timer and the second timer such that the second timer expires in a time period after the first timer has been started and before the first timer has expired,
wherein controlling the second timer comprises modifying the second timer, and
wherein modifying the second timer comprises setting the second timer to a predefined connected mode second value before starting the second timer.

2. The method of claim 1, wherein, upon detection that system information of a previous serving cell is missing or cannot be acquired, at least one of the first timer and the second timer is modified.

3. The method of claim 2, wherein, after starting the first timer and upon the detection that the system information of a previous serving cell is missing or cannot be acquired, the following are performed:
starting the second timer with a predefined second timer value; and
modifying the first timer based on the predefined second timer value.

4. The method of claim 3, wherein modifying the first timer comprises replacing an actual first timer value of the first timer by a new first timer value.

5. The method of claim 4, wherein the new first timer value equals a sum of the actual first timer value before modification and a value equal or greater than the second timer value.

6. The method of claim 1, wherein the predefined connected mode second value is determined such that it is smaller than an initial value of the first timer.

7. The method of claim 6, wherein the predefined connected mode second value equals a minimum initial value that may be commanded by network, divided by a modification value, wherein the modification value is greater than 1.

8. The method of claim 1, wherein modifying the second timer comprises, before starting the second timer:
in response to the UE being in a connected mode, setting the second timer to the predefined connected mode second value;
in response to the UE not being in the connected mode, setting the second timer to a different value.

9. The method of claim 8, wherein the predefined connected mode second value is determined such that it is smaller than an initial value of the first timer.

10. The method of claim 9, wherein the predefined connected mode second value equals a minimum initial value that may be commanded by network, divided by a modification value, wherein the modification value is greater than 1.

11. The method of claim 2, further comprising inhibiting starting the second timer in response to detecting that the system information of the previous serving cell cannot be acquired while the first timer is running.

12. The method of claim 11, wherein, after unsuccessfully trying to connect to another cell different from the previous serving cell, the following are performed:
deeming that system information previously read and related to the previous serving cell is still valid; and
connecting to the previous serving cell using the previously read system information.

13. A user equipment adapted to perform a Radio Resource Control (RRC) connection establishment procedure, the user equipment comprising:
a first timer configured to control that a selection of a cell is performed within a first time;
a second timer configured to control that the cell is regarded as being barred if certain system information associated to that cell cannot be acquired;
a processing circuit configured to perform cell selection in accordance with a cell selection process and based on the first and second timers;
a timer controller circuit configured to control the first timer and the second timer such that the second timer expires after the first timer has been started and before the first timer has expired,
wherein the timer controller circuit is further configured to modify the second timer and to set the second timer to a predefined connected mode second value before starting the second timer.

14. A computer program product stored in a non-transitory computer readable medium for controlling performance of Radio Resource Control (RRC) connection establishment by a user equipment, the computer program product comprising software instructions which, when run on one or more processing circuits of the user equipment, causes the user equipment to:
perform a cell selection in accordance with a cell selection process, wherein a first timer is used to control that the cell selection process is performed within a first time, and a second timer is used to control that a cell is treated as barred for a second time if certain system information associated to that cell is missing or cannot be acquired;
control the first timer and the second timer such that the second timer expires in a time period after the first timer has been started and before the first timer has expired wherein the user equipment is further configured to modify the second timer and to,
set the second timer to a predefined connected mode second value before starting the second timer.

* * * * *